United States Patent
Baentsch et al.

(10) Patent No.: US 6,792,612 B1
(45) Date of Patent: Sep. 14, 2004

(54) JAVA RUNTIME SYSTEM WITH MODIFIED CONSTANT POOL

(75) Inventors: Michael Baentsch, Langnau Am Albis (CH); Peter Buhler, Ruschlikon (CH); Marcus Oestreicher, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/646,720

(22) PCT Filed: Nov. 12, 1998

(86) PCT No.: PCT/IB98/01799

§ 371 (c)(1),
(2), (4) Date: Sep. 21, 2000

(87) PCT Pub. No.: WO99/49392

PCT Pub. Date: Sep. 30, 1999

(30) Foreign Application Priority Data

Mar. 23, 1998 (EP) .............................. 98105179

(51) Int. Cl.⁷ .............................. G06F 3/00; G06F 9/44; G06F 9/46; G06F 13/00
(52) U.S. Cl. ...................................... 719/331; 719/332
(58) Field of Search ................................ 709/331, 332; 719/328–332

(56) References Cited

U.S. PATENT DOCUMENTS

| | | | |
|---|---|---|---|
| 5,291,601 A | 3/1994 | Sands | ......................... 395/700 |
| 5,581,768 A | 12/1996 | Garney et al. | .............. 395/674 |
| 6,112,025 A * | 8/2000 | Mulchandani et al. | ...... 709/331 |
| 6,308,317 B1 * | 10/2001 | Wilkinson et al. | .......... 717/139 |
| 6,366,876 B1 * | 4/2002 | Looney | ........................ 703/25 |

FOREIGN PATENT DOCUMENTS

EP 0 810 522 12/1997 ........... G06F/9/445

OTHER PUBLICATIONS

Sun Microsystems, *Java Card 2.0 Language Subset and Virtual Machine Specification* product brochure, Oct. 13, 1997 Revision 1.0 Final.

IBM Technical Disclosure Bulletin, Title: *C Inter–Linkage Invocation Method*, Sep. 1, 1992, pp. 44–49.

* cited by examiner

Primary Examiner—Thomas Lee
Assistant Examiner—Diem K. Cao
(74) Attorney, Agent, or Firm—Ohlandt, Greeley, Ruggiero & Perle, L.L.P.; Casey P. August

(57) ABSTRACT

A Java runtime system is proposed which comprises a stack-based interpreter executing a program that comprises bytecodes and class structures. The system further comprises a modified constant pool with internal information of use only during linking and with external information to be preserved for late code binding. The internal information is removed from the modified constant pool after linking.

11 Claims, 3 Drawing Sheets

JAVA RUNTIME SYSTEM WITH MODIFIED CONSTANT POOL

BACKGROUND OF THE INVENTION

1. Field of the Invention

The present invention concerns dynamic code down load and linking in resource constraint Java runtime environments, such as in JavaCards for example.

2. Description of Related Art

In a conventional Java system, references to class structures (internal and external) are resolved using indirect name lookup via a so-called constant pool. Such an approach can only be used in a system providing sufficient resources in terms of processing power and internal resources.

In a resource constraint runtime system (e.g. a JavaCard) this approach is not promising. Instead, one might use resolved references to class structures, such that indirections are obviated and maintaining the constant pool can be avoided.

BRIEF SUMMARY OF THE INVENTION

The resolving of the references (linking) is subject of the present invention.

It is an object of the present invention to achieve efficient linking in resource constraint Java runtime environments.

It is an object of the present invention to achieve space and runtime efficient linking in resource constraint Java runtime environments.

DETAILED DESCRIPTION OF THE INVENTION

In the following, a general overview of the present invention will be given and implemetation aspects will be addressed. Java is a programming language and environment developed by Sun Microsystems, Inc. 2550 Garcia Ave., Mountain View, Calif. 94043-1100, USA; the term "Java" is a trademark of this company.

Since the present description also deals with details of the implementation, the person skilled in the art is assumed to be familiar with the basic mechanisms of the Java Virtual machine and its implementation. A comprehensive presentation of the Java language and its implementation of the JVM was disclosed by J. Goslin, B. Joy, and G. Tele in "The Java Language Specification" and T. Lindholm and F. Yellin in "The Java Virtual machine Specification", both by Addison-Wesley Publishing Co., 1996. Please note however, that the Java-Card Virtual machine, herein referred to as Java-Card VM, is different in several aspects since only a subset and additional bytecodes are used.

1.0 JavaSoft CAP File Format Proposal

Figure 1:
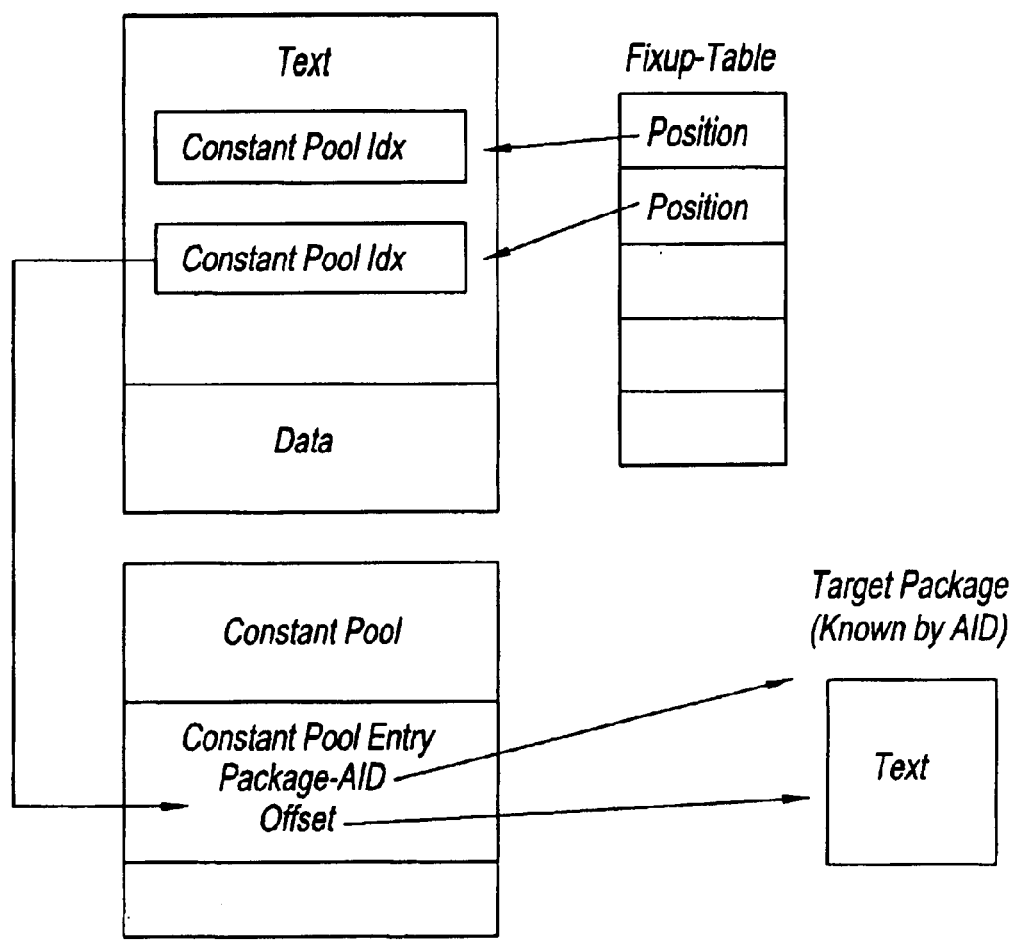
FIG. 1 illustrates the linking with the JavaSoft proposed cap file format.

As shown in FIG. 1, the CAP file format, as proposed by JavaSoft, divides a cap file into several sections. A cap file basically contains a text and a data section. The text section contains the class structures, method structures and the bytecode instructions. The data section contains the static fields of the cardlet.

The text section references all symbols (classes. methods etc.) whose actual addresses are not known before link time via an offset into the constant pool. For every such symbol the constant pool contains the AID for the target package and the offset of that symbol in that target package (i.e. the package being linked against). The constant pool provides these offsets for all imported symbols (the symbols defined in other packages) and for all exported symbols (the symbols defined and accessed within the cardlet being loaded).

The organization of the text section, data section and constant pool provides sufficient information for executing a cardlet. After loading a cardlet, the linker could step through the constant pool and replace the offsets of the symbols into their target packages with their real addresses. The linker merely has to look up the specific package by the given AID, add its start address to the symbol offset and store this information back into the constant pool. The Java-Card VM then can use these addresses in the constant pool for the interpretation. However, the constant pool itself is not needed at runtime. In fact, it would require one additionally unnecessary indirection to find the address of a symbol during the interpretation. Moreover, the constant pool takes up space on the card unnecessarily. The JavaSoft cap file format therefore uses fixup tables for the individual sections to remove the requirement for the constant pool after linking. The fixup table contains all the positions in the text section where a relocation has to take place. The linker walks through the fixup table and takes the offset at that position into the constant pool. Then it resolves the address of that symbol and stores it at the original position in the text section. The interpreter can then directly use these addresses at runtime and therefore the constant pool can be removed after the linking process. The only sections remaining on the card after the link process are the text and data sections.

The linking of cardlets with precalculated and hardcoded offsets into target packages allows a compact system. However, it does not provide enough flexibility for allowing different implementations of system classes and specified extensions on different cards. For example, a cardlet which was converted against the system classes of IBM and an extension of JavaSoft is unlikely to run on a card with the system cardlet from JavaSoft and the extension cardlet coming from IBM. The primary reason for this is that the offsets of individual classes, methods and the field offsets of instances will differ from implementation to implementation.

The following invention extends upon the ideas of the current JavaSoft proposal and enhances it by an additional lightweight and flexible symbolic linking mechanism.

2.0 Inventive CAP File Format

Figure 2:
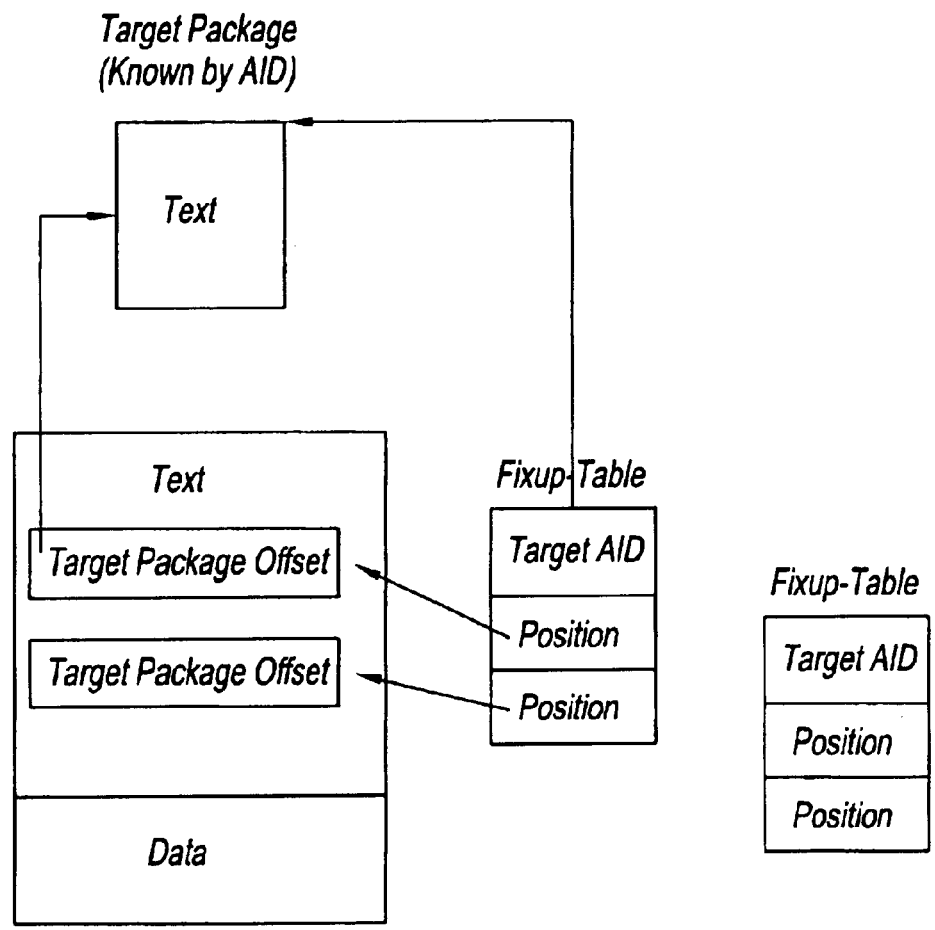
FIG. 2 illustrates the linking by offset with the herein proposed file format.

As shown in FIG. 2, the cap file format according to the present invention also divides the cap file into different sections. The text section contains the class structures, method structures and bytecode instructions, the data section again the static fields. The cap file also maintains the necessary relocation information in fixup tables. There is one fixup table for every package the cardlet is linked to (i.e. the target package).

The fixup table again contains the position in the text or data section where a relocation has to take place. In the simple case, these places are also relocated by a precalculated offset into trusted and well known target packages. In this case, the linker will look up the start address of the package with the given Target AID, add the offset into the target package and store that value at the original position in the text section. The offset into the target package can be kept either in the fixup table or in the text section at the relocation address to keep the fixup table smaller. The relocation by offset can always be used for most of the references within the loaded cardlet itself. The converter is permitted to precalculate these offsets without breaking compatibility.

For system integrity reasons, references to other external packages should not be linked by precalculated offsets. Instead, a name or identifier should be used for references to other packages during the link process. These names and their associated values must only be stored on the card for packages which are shared between multiple applets. As these tables of name/value pairs should be as small as possible, this cap file format restricts the naming of class file elements, but still provides the possibility of vendor specific implementations of different specifications:

public classes: must be named and exportable.

public static methods and constructors: ditto public static fields: ditto virtual methods:

The interpreter finds a virtual method via an index into the virtual method table. These indices and the virtual method table would need to be resolved on the card if the JavaCard environment wants to support the standard Java late code binding of virtual methods. During the method table construction the linker has to decide if a method inherits another method in the method table. As these methods could be defined in different cardlets, a global naming scheme for methods must be introduced in order to decide whether two methods have the same type. As the late code binding of virtual method calls requires a global naming scheme and additional resources on the card for resolving and namding virtual methods, the inventive cap file format does not support it. But even with this limitation, sufficient room for vendor specific implementations of core packages and extensions remains. The programmer can freely add private or static methods and classes. He can also add non private instance methods if they are not inherited and declared as final. The converter can then replace calls to these methods with direct invocations.

instance fields:

The number and types of instance fields in a class are not usually defined by specifications and will vary between the implementations of different vendors. Therefore the binding of field offsets must be addressed by a the CAP file format proposal. The usage of fields regarding the link process can be separated into the following three categories:

precalculated field offsets

A get-/put-field instruction references a field whose class and all superclasses are defined in the containing cardlet. The offset of this field can then be precalculated by the converter and need not be linked during the load process. If there is an agreement that the Object class does not contain any field declarations a lot of field accesses will fall under this category.

access to fields of cardlet-intemnal classes with any cardlet-external superclass(es)

This case must be supported by a cap file format to allow the subclassing of classes defined in separate packages. The converter can calculate the offset of the field relative to the instance size of the cardlet-external superclass and store this value in the cap file. During the link process the actual offset of the field has to be recomputed based on the size of the base class. The same can be done for the instance size element of the cardlet internal class.

access to fields in cardlet-external superclasses or in any external class Although instance fields are rarely declared as public, they are often declared as protected. The access to protected fields could always be granted by specifying protected set-/-get-field methods, but the proposed cap file format also allows a direct access to such protected or public declared fields. A package which exports a protected or public instance field must contain a name and the offset for such a field to allow for symbolic linking.

A package which exports classes, methods or fields contains a constant pool whose entries contain the type (class etc.), the name and the value for that symbol. As the cap file format does not need to support a global naming scheme, the names for the associated symbols can be easily specified. The symbols can be numbered from 0 to n and can be handed out together with a specification of the application programming interface (API). The implementor of such a specification is still able to export additional classes etc. by choosing new names beginning from n+1.

Figure 3:
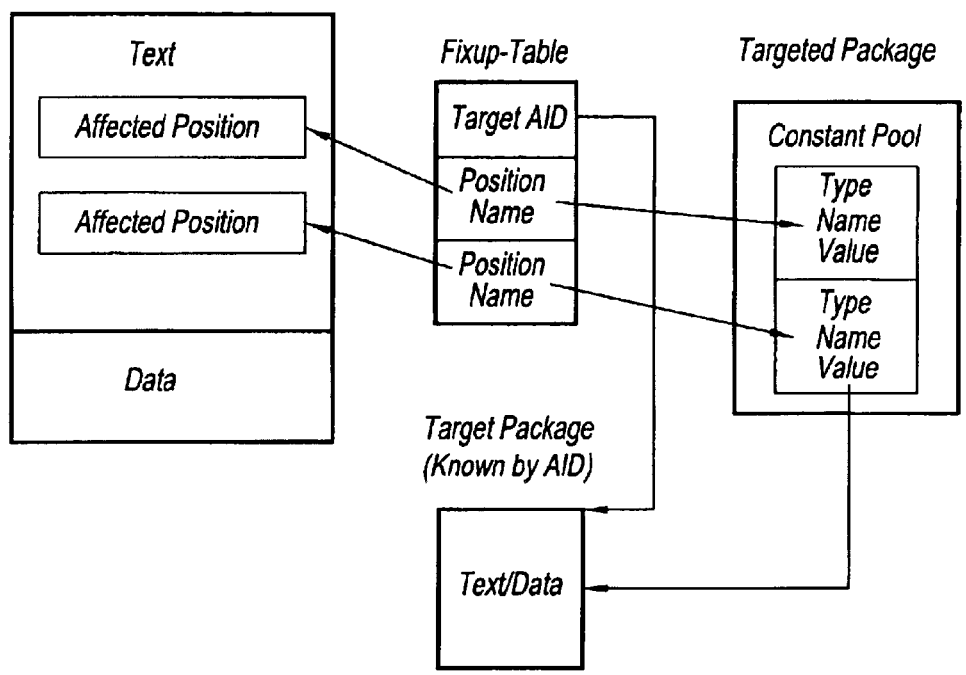
FIG. 3 illustrates the linking by name with the herein proposed file format.

FIG. 3 shows the symbolic binding of an applet against a target package. The entries in the fixup table contain the type of the relocation (see below), an offset into the text section where to relocate to, and the name of the symbol (which for space-efficiency might also be stored at the position to relocate). With the proposed naming scheme the name can be used as an index into the constant pool of the target package. The entries in the constant pool contain the type of the entry, the name and the associated value. The linker relocates the entries in the fixup table depending on the type of the entry:

A method has to be relocated:

The constant pool item of the target package with the given name must be a method type. The value must be an offset into the target package where the method is defined. The linker calculates the address of the method and fixes the text section at the given offset.

A class has to be relocated:

same as above, except that the constant pool item with the symbol index and name must be a class type.

A static field has to be relocated:

same as above, except that the constant pool item with the symbol index and name must be a static field type, the value is an offset into the data section of the package.

A relative instance field offset or a relative class instance size value must be relocated:

The constant pool item of the target package with the given name must be a class type. The linker calculates the address of the target class and gets the instance size of the class (the latter is an element of the class structure). The linker adds the instance size to the value given at the text section offset and replaces the latter with the sum.

An absolute field access to an undefined class:

The constant pool item of the target package with the given name must be an instance field type. The value of that item is the absolute offset of that field in an instance of its class.

If the loaded cardlet is a shared package and exports protected or public fields the linker relocates their entries in the constant pool, too. Their real offsets are relocated in the same manner as relative instance field offsets.

The fixup tables can be removed once the link process is finished. Applets do not need a constant pool, only packages which can be shared between multiple applets need the constant pool for future usage. The size of the constant pool depends on the number of exported items and on the size of an item. A constant pool for the current JavaCard system classes takes currently about 160 items. A constant pool item contains a type field, a name and a value which can be stored in 4 bytes (with the proposed naming scheme this could even be reduced to three bytes). This results in a constant pool size of 720 bytes for all system classes.

Differences to the JavaSoft proposal:

The JavaSoft constant pool currently does not differentiate between internally defined and externally defined items. This makes it difficult to remove the constant pool items covering internally defined items.

The field offsets in the get-/put-field instructions and the instance size field in the class structure are only 8 bit wide. This makes it currently impossible to use this values as indices into the constant pool where information could be stored to bind the offset of a field during the link process.

Due to these two limitations, the current JavaSoft proposal needs enhancements to make a necessary lightweight naming scheme—like the one herein proposed—possible.

3.0 Appendix 3.1 Minor Extensions

In some environments there might be no need or no space for any symbolic information on the card at all, e.g. it might be sufficient to use only precalculated offsets during the link process. The cap file format according to the present invention can be extended in a safe manner in this direction:

A package or applet does not only contain a version number but also a vendor id (or implementation id).

The entries in the fixup tables which reference constant pool items also contain the offsets which the converter could calculate during conversion time At the beginning of the download process the loader checks if the packages which are required by the applet are from the same vendor (e.g. the same imiplementation) as the ones currently installed on the card. If this is true, the loader uses the offsets in the applet cap file during the link process. Otherwise the download process fails.

3.2 Specifications for referred cap file format items

The purpose of the detailed description is not to strictly specify the contents of a cap file. Instead it provides a detailed discussion in what should and what must be in the cap file starting with the proposal of JavaSoft. Nevertheless. we are also providing more formal specifications of the cap file format items mentioned in this description in C-like declarations. These are specified here for clarity and in non optimized form:

```
// the format of a fixup table
typedef struct _fixup_table{
  u1 target_aid_cnt;
  u1 target_aid[ ];
  u1 entries_cnt;
  fixup_entry_t entries[ ];
};
// the layout of a fixup entry
typedef struct _fixup_entry{
  u1 type;
  u2 offset;          // the offset into the text or data
  union{
    u2 target_offset;   // offset into target package
    u2 symbol_name;     // name and index into target constant pool
  }value;
```

```
} fixup_entry_t;
// the individual fixup entry types
// relocate a 16bit address in the text or data section by offset,
// this can cover the addresse of classes, methods etc.
#define RELO_TEXT_16BIT_WITH_OFFSET
#define RELO_TEXT_16BIT_WITH_OFFSET
// relocate the value of a symbol into the text section
#define RELO_CLASS_BY_SYM
#defineRELO_METHOD_BY_SYM
#define RELO_STATICFIELD_BY_SYM
#define RELO_INSTANCEFIELD_BY_SYM
// the layout of the constant pool
typedef struct _constant_pool{
  u2 cnt;
  cp_item_t items[cnt];
};
// the layout of a constant pool item
typedef struct _cp_item{
  unsigned type:4;     // the type of the item
  unsigned name:12;    // the name if needed at all
  u2 offset;           // the offset
};
// the constant pool item types
#define CONSTPOOL_CLASS
#define CONSTPOOL_METHOD
#define CONSTPOOL_STATICFIELD
#define CONSTPOOL_INSTANCEFIELD
```

What is claimed is:

1. A Java runtime system comprising a stack based interpreter executing a program comprising bytecodes and class structures, said system further comprising:

a modified constant pool with internal information of use only during linking and with external information to be preserved for late code binding;

a cap file for resolving external links that includes an identifier for references to said external information, said identifier being used as an index into said modified constant pool; and a linker for linking said program using said modified constant pool and said cap file;

wherein said internal information is removed from said modified constant pool after linking.

2. The Java runtime system of claim 1 being a JavaCard.

3. A method for introducing new code into a Java runtime system which comprises a stack-based interpreter for the execution of a package comprising bytecodes and class structures, said method comprising the steps of:

internal linking of said new code to said package existing in said system, whereby an offset of said new code with respect to itself is substituted by a reference known only at link time;

resolving external links using a cap file that includes an identifier for references to external information, said identifier being used as an index into a constant pool of said package; and removing at least the information from said constant pool which was used for substitution by said references known only at link time.

4. The method of claim 3, wherein information used for linking to external packages is removed from said constant pool.

5. The method of claim 3, wherein the remaining information in said constant pool allows other packages and applets, which are down loaded later, to properly access said new code.

6. The method of claim 3, wherein said Java runtime is a JavaCard.

7. A computer readable program embodied in a storage media including computer readable program instructions for controlling a Java runtime system for introducing new code into a Java runtime system, said storage media comprising:

computer readable program instructions for internal linking of said new code to a package existing in said system, whereby an offset of said new code, with respect to itself, is substituted by a reference known only at link time;

computer readable program instructions for resolving external links using a cap file that includes an identifier for references to external information, said identifier being used as an index into a constant pool of said package; and computer readable program instructions for removing from said constant pool said reference used for substitution.

8. The storage media of claim 7 further comprising computer readable program instructions for relocating entries in a fixup table depending on a type of entry, said entries including said type of entry, said identifier, and a value.

9. The storage media of claim 7 further comprising computer readable program instructions for removing information used for linking to an external package from said constant pool.

10. The storage media of claim 7 wherein the storage media comprises computer readable program instructions for information remaining in said constant pool to allow late code binding.

11. The computer readable program embodied in said storage media of claim 7 further comprising computer readable program instructions for controlling said Java runtime system when said Java runtime system is a JavaCard.

* * * * *